(12) United States Patent
Dunwoody et al.

(10) Patent No.: US 11,245,230 B2
(45) Date of Patent: Feb. 8, 2022

(54) EMI SHIELDING FOR A RECEPTACLE CAGE

(71) Applicant: TE Connectivity Services GmbH, Schaffhausen (CH)

(72) Inventors: Steven David Dunwoody, Middletown, PA (US); Alex Michael Sharf, Harrisburg, PA (US); Richard James Long, Columbia, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/876,940

(22) Filed: May 18, 2020

(65) Prior Publication Data
US 2021/0359470 A1 Nov. 18, 2021

(51) Int. Cl.
*H01R 13/6582* (2011.01)
*H01R 13/52* (2006.01)
*H01R 13/627* (2006.01)

(52) U.S. Cl.
CPC ..... *H01R 13/6582* (2013.01); *H01R 13/5219* (2013.01); *H01R 13/6273* (2013.01)

(58) Field of Classification Search
CPC ............ H01R 13/6582; H01R 13/6583; H01R 13/5219; H01R 13/6273
USPC ........................... 439/607.2, 607.21, 607.24
See application file for complete search history.

(56) References Cited

U.S. PATENT DOCUMENTS

| | | | |
|---|---|---|---|
| 6,752,663 B2 * | 6/2004 | Bright .................. | G02B 6/4201 439/607.25 |
| 6,816,376 B2 | 11/2004 | Bright et al. | |
| 6,881,095 B2 * | 4/2005 | Murr .................. | H01R 13/6275 439/607.2 |
| 10,194,565 B2 | 1/2019 | Zhou et al. | |
| 10,819,072 B2 * | 10/2020 | Suda .................. | H01R 13/6594 |
| 2013/0048367 A1 * | 2/2013 | Ljubijankic ........ | H01R 13/6583 174/354 |
| 2013/0051738 A1 * | 2/2013 | Ito ........................ | H05K 9/0049 385/92 |
| 2014/0196943 A1 | 7/2014 | Hirschy | |
| 2016/0218455 A1 * | 7/2016 | Sayre .................. | H01R 13/6594 |

* cited by examiner

*Primary Examiner* — Gary F Paumen

(57) ABSTRACT

A receptacle cage includes cage walls forming a module channel that is configured to receive a pluggable module. The cage walls extend between a front end and a rear end of the receptacle cage. At least one of the cage walls is a latch wall including a latching feature configured to engage a latch of the pluggable module to retain the pluggable module in the module channel. The receptacle cage includes a first slider pressure tab. The first slider pressure tab extends from the latch wall into the module channel. The first slider pressure tab is configured to engage a slider arm of the latch to press the slider arm inward toward a pluggable module body of the pluggable module.

20 Claims, 4 Drawing Sheets

EMI SHIELDING FOR A RECEPTACLE CAGE

BACKGROUND OF THE INVENTION

The subject matter herein relates generally to receptacle cages.

Some communication systems utilize receptacle assemblies having communication connectors to interconnect various components of the system for data communication. The receptacle assemblies include receptacle cages that receive pluggable modules, such as I/O modules, that are electrically connected to the communication connector. The receptacle cages provide electrical shielding, such as EMI shielding, for the pluggable modules. Conventional receptacle cages have gaskets at the interface with the pluggable module. However, conventional communication systems have performance problems, particularly when transmitting at high data rates. For instance, EMI leakage may occur between the pluggable module and the receptacle cage, such as at the interface between the pluggable module and the communication connector or along the slider arms of the latch used for retaining the pluggable module in the receptacle cage.

A need remains for a receptacle cage having improved electrical shielding.

BRIEF DESCRIPTION OF THE INVENTION

In one embodiment, a receptacle cage is provided including cage walls forming a module channel that is configured to receive a pluggable module. The cage walls extend between a front end and a rear end of the receptacle cage. At least one of the cage walls is a latch wall including a latching feature configured to engage a latch of the pluggable module to retain the pluggable module in the module channel. The receptacle cage includes a first slider pressure tab. The first slider pressure tab extends from the latch wall into the module channel. The first slider pressure tab is configured to engage a slider arm of the latch to press the slider arm inward toward a pluggable module body of the pluggable module.

In another embodiment, a receptacle cage is provided. The receptacle cage includes cage walls including a top wall, a first side wall, and a second side wall. The top wall, the first side wall, and the second side wall form a module channel that is configured to receive a pluggable module. The cage walls extend between a front end and a rear end of the receptacle cage. Tabs are stamped from at least one of the cage walls and bent into the module channel. The tabs are configured to engage a latch of the pluggable module. The tabs have tab gaps in the at least one cage wall around the formed by the stamping. At least one cover is coupled to the cage walls to cover the tab gaps and the tabs to prevent EMI leakage through the tab gaps.

In a further embodiment, a receptacle cage is provided. The receptacle cage includes cage walls including a top wall, a first side wall, and a second side wall. The top wall, the first side wall, and the second side wall form a cavity including a module channel that is configured to receive a pluggable module. The cage walls extend between a front end and a rear end of the receptacle cage. At least one of the cage walls include a latching feature configured to engage a latch of the pluggable module to retain the pluggable module in the module channel. The first side wall includes a first slider pressure tab that extends into the module channel. The first slider pressure tab is configured to engage a slider arm of the latch to press the slider arm inward toward a pluggable module body of the pluggable module. The receptacle cage includes a communication module received in the cavity. The communication module is configured to mate with a mating end of the pluggable module. The receptacle cage includes a front gasket at the front end of the receptacle cage. The front gasket includes front gasket fingers that extend into the module channel. The front gasket fingers are configured to engage the pluggable module. The receptacle cage includes a rear gasket coupled to the receptacle cage. The rear gasket is located immediately forward of the communication module. The rear gasket includes rear gasket fingers that extend into the module channel. The rear gasket fingers are configured to engage the pluggable module.

DETAILED DESCRIPTION OF THE INVENTION

Figure 1:
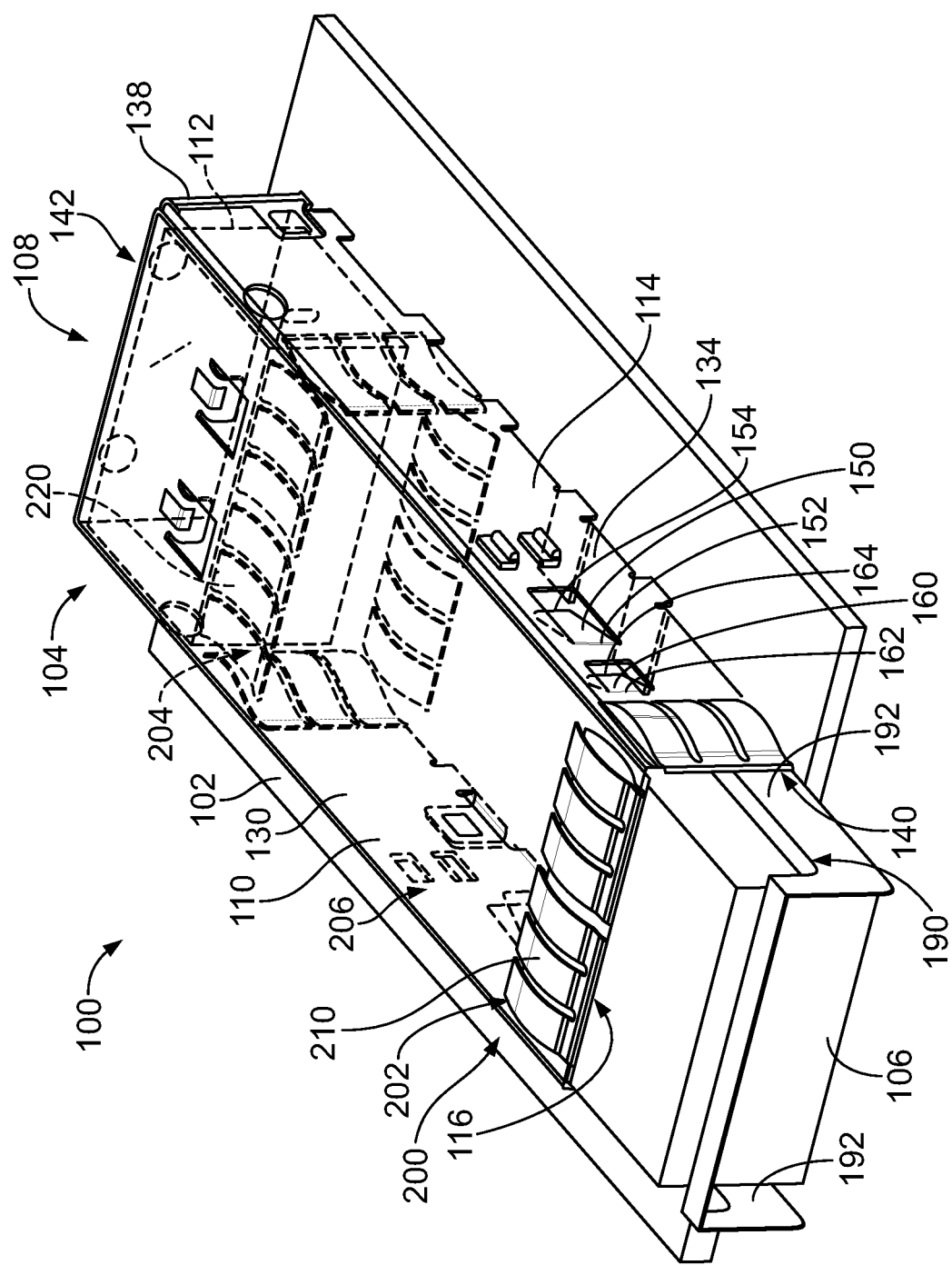
FIG. 1 is a top perspective view of a communication system formed in accordance with an exemplary embodiment.
Figure 2:
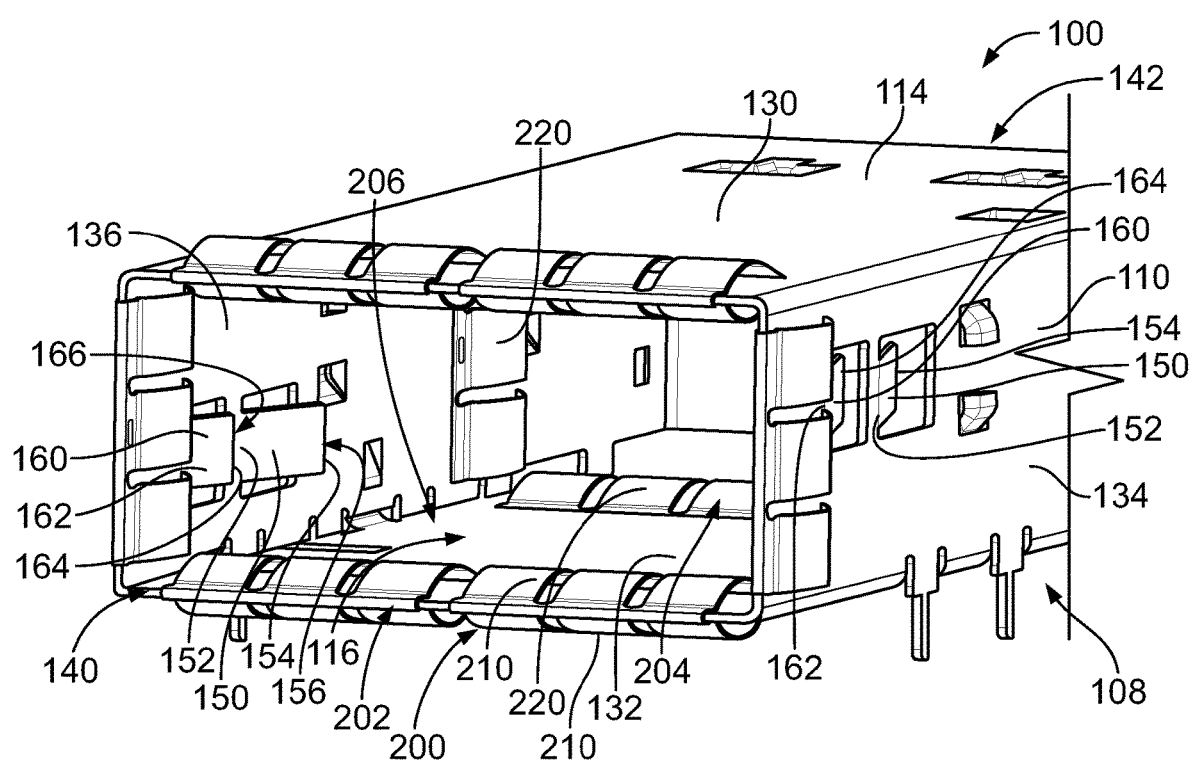
FIG. 2 is a front perspective view of a portion of the communication system in accordance with an exemplary embodiment.

FIG. 1 is a top perspective view of a communication system 100 formed in accordance with an exemplary embodiment. FIG. 2 is a front perspective view of a portion of the communication system 100 in accordance with an exemplary embodiment. The communication system 100 includes a circuit board 102 (FIG. 1) and a receptacle connector assembly 104 mounted to the circuit board 102. A pluggable module 106 (FIG. 1) is electrically connected to the receptacle connector assembly 104. The pluggable module 106 is electrically connected to the circuit board 102 through the receptacle connector assembly 104.

In an exemplary embodiment, the receptacle connector assembly 104 includes a receptacle cage assembly 108 and a communication connector 112 (shown in phantom) adjacent the receptacle cage assembly 108. For example, in the illustrated embodiment, the communication connector 112 is received in the receptacle cage assembly 108. In other various embodiments, the communication connector 112 may be located rearward of the receptacle cage assembly 108.

In an exemplary embodiment, the receptacle cage assembly 108 includes a receptacle cage 110 and a gasket assembly 200 electrically coupled to the receptacle cage 110 to provide EMI shielding for the receptacle cage 110. The gasket assembly 200 includes a front gasket 202 and a rear gasket 204 (shown in phantom in FIG. 1) forming a shield chamber 206 therebetween that provides EMI shielding within the receptacle cage 110 along the pluggable module 106. The gasket assembly 200 may be provided without the rear gasket 204 in alternative embodiments. The front and rear gaskets 202, 204 may include separate and discrete pieces that are welded or clipped to the receptacle cage 110 to electrically connect the gasket assembly 200 to the receptacle cage 110. In an exemplary embodiment, the front and rear gaskets 202, 204 may be stamped and formed gaskets. The front gasket 202 includes gasket fingers 210 providing EMI shielding around the receptacle cage 110 and the rear gasket 204 includes gasket fingers 220 providing EMI shielding around the receptacle cage 110. Other types of gaskets may be used in alternative embodiments, such as a compressible gasket, a mesh gasket, or another type of gasket.

In various embodiments, the receptacle cage 110 is enclosed and provides electrical shielding for the communication connector 112. The receptacle cage 110 is configured to surround at least a portion of the pluggable module 106 to provide shielding for the pluggable module 106. The receptacle cage 110 includes a plurality of cage walls 114 that define one or more module channels 116 for receipt of corresponding pluggable modules 106. The cage walls 114 may be walls defined by solid sheets, perforated walls to allow airflow therethrough, walls with cutouts, such as for a heatsink or heat spreader to pass therethrough, or walls defined by rails or beams with relatively large openings, such as for airflow therethrough. In an exemplary embodiment, the receptacle cage 110 is a shielding, stamped and formed cage member with the cage walls 114 being shielding walls.

In the illustrated embodiment, the receptacle cage 110 includes a single module channel 116 for receiving a single pluggable module 106. The receptacle cage 110 has a port that is open at the front of the receptacle cage 110 to receive the pluggable module 106. Any number of module channels 116 may be provided in various embodiments. For example, the receptacle cage 110 may constitute a stacked cage member having upper and lower module channels 116 to receive multiple pluggable modules 106 in a stacked arrangement in an alternative embodiment. The upper and lower module channels 116 may be arranged in a single column; however, the receptacle cage 110 may include multiple columns of ganged module channels 116 in alternative embodiments (for example, 2×2, 3×2, 4×2, 4×3, etc.). In other various embodiments, rather than being a stacked cage member, the receptacle cage 110 may include ganged module channels 116 in a single row (for example, 1×2, 1×4, etc.). Optionally, multiple communication connectors 112 may be arranged within the receptacle cage 110, such as when multiple columns or rows of module channels 116 are provided.

In an exemplary embodiment, the cage walls 114 of the receptacle cage 110 include a top wall 130, a bottom wall 132, a first side wall 134, a second side wall 136 and a rear wall 138. At least one of the cage walls 114 defines a latch wall having a latching feature configured to interface with the latch of the pluggable module 106 to retain the pluggable module 106 in the module channel 118. For example, the first side wall 134 may be a latch wall 134; the second side wall 136 may be a latch wall 136; the top wall 130 may be a latch wall 130; and/or the bottom wall 132 may be a latch wall 132. The bottom wall 132 may rest on the circuit board 102. However, in alternative embodiments, the receptacle cage 110 may be provided without the bottom wall 132. The receptacle cage 110 extends between a front end 140 and a rear end 142. The port(s) is provided at the front end 140 to receive the pluggable module 106 through the front end 140. The cage walls 114 define a cavity. For example, the cavity may be defined by the top wall 130, the bottom wall 132, the side walls 134, 136 and the rear wall 138. The cavity defines the module channel 116 that receives the pluggable module 106. The cavity receives the communication connector 112. Other cage walls 114 may separate or divide the cavity into a plurality of module channels 116, such as stacked or ganged module channels. For example, the cage walls 114 include a divider (not shown). The divider may be a horizontal divider (for example, a separator plate) positioned between upper and lower module channels 116. In other various embodiments, the divider may define a vertical separator panel (not shown), such as parallel to the side walls 134, 136.

In an exemplary embodiment, the receptacle connector assembly 104 may include one or more heat sinks (not shown) for dissipating heat from the pluggable modules 106. For example, the heat sink may be coupled to the top wall 130 for engaging the upper pluggable module 106 received in the upper module channel 116. The heat sink may extend through an opening in the top wall 130 to directly engage the pluggable module 106. Other types of heat sinks may be provided in alternative embodiments.

In an exemplary embodiment, the communication connector 112 is received in the cavity of the receptacle cage 110, such as proximate to the rear wall 138. However, in alternative embodiments, the communication connector 112 may be located behind the rear wall 138 exterior of the receptacle cage 110 and extend into the cavity to interface with the pluggable module(s) 106. For example, the rear wall 138 may include an opening to receive components therethrough.

In an exemplary embodiment, the pluggable modules 106 are loaded into the receptacle cage 110 through the front end 140 to mate with the communication connector 112. The shielding cage walls 114 of the receptacle cage 110 provide electrical shielding around the communication connector 112 and the pluggable modules 106, such as around the mating interfaces between the communication connector 112 and the pluggable modules 106. The gasket assembly 200 interfaces with the pluggable modules 106 to electrically connect the receptacle cage 110 to the pluggable modules 106 and to close any gaps between the pluggable modules 106 and the receptacle cage 110 to prevent EMI leakage through such gaps. The communication connector 112 is coupled to the circuit board 102. The receptacle cage 110 is mounted to the circuit board 102 over the communication connector 112.

In an exemplary embodiment, the front gasket 202 is provided at the front end 140 to electrically connect with a panel (not shown) to electrically connect the receptacle cage 110 to the panel. For example, the front end 140 of the receptacle cage 110 extends through a panel opening in the panel such that the front end 140 is forward of the panel and the rear end 142 is rearward of the panel. The front gasket 202 prevents EMI leakage through the panel opening.

In an exemplary embodiment, the receptacle cage 110 includes one or more latching features 150 configured to engage a latch of the pluggable module 106. The latching features 150 extend from one or more of the walls defining latch walls. In various embodiments, the latching features 150 include retainer tabs and may be referred to hereinafter as retainer tabs 150. In an exemplary embodiment, the retainer tabs 150 extend from the side walls 134, 136 into the module channel 116. The retainer tabs 150 are used to retain the pluggable module 106 in the module channel 116. For example, the retainer tabs 150 interface with a latch 190 of the pluggable module 106. The retainer tabs 150 are deflectable and configured to be moved from a latched position to an unlatched position to allow removal of the pluggable module 106. In an exemplary embodiment, each retainer tab 150 extends between a proximal end 152 and a distal end 154. In the illustrated embodiment, the distal end 154 is located rearward of the proximal end 152; however, the retainer tab 150 may have other orientations in alternative embodiments. The retainer tab 150 is deflectable relative to the side wall 134, 136 at the proximal end 152. The proximal end 152 is fixed at the side wall 134, 136. The retainer tab 150 is bent inward into the module channel 116 such that the distal end 154 is located in the module channel 116 to engage the pluggable module 106. In an exemplary embodiment, the retainer tab 150 has an edge 156 at the distal end 154 that engages the latch 190.

In an exemplary embodiment, the receptacle cage 110 includes slider pressure tabs 160 extending from the side walls 134, 136 into the module channel 116. The slider pressure tabs 160 are deflectable and configured to press against slider arms 192 of the latch 190 to press the slider arms 192 inward, such as into engagement with the body of the pluggable module 106 to create an electrical connection between the slider arms 192 and the body of the pluggable module 106 to reduce EMI leakage along the pluggable module 106. The slider pressure tabs 160 create an electrical connection between the latch 190 and the receptacle cage 110 for grounding and/or shielding.

In an exemplary embodiment, each slider pressure tab 160 extends between a proximal end 162 and a distal end 164. In the illustrated embodiment, the distal end 164 is located rearward of the proximal end 162; however, the slider pressure tab 160 may have other orientations in alternative embodiments. The slider pressure tab 160 is deflectable relative to the side wall 134, 136 at the proximal end 162. The proximal end 162 is fixed at the side wall 134, 136. The slider pressure tab 160 is bent inward into the module channel 116 such that the distal end 164 is located in the module channel 116 to engage the pluggable module 106. In an exemplary embodiment, the slider pressure tab 160 has an edge 166 at the distal end 164 that engages the slider arm 192.

Figure 3:
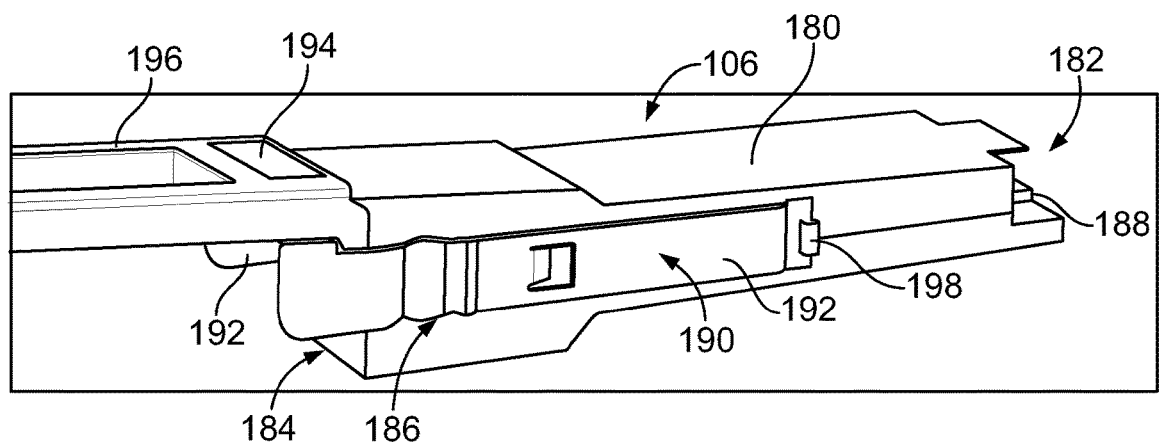
FIG. 3 is a rear perspective view of the pluggable module in accordance with an exemplary embodiment.

FIG. 3 is a rear perspective view of the pluggable module 106 in accordance with an exemplary embodiment. The pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 and an opposite front end 184. The front end 184 may be a cable end having a cable extending therefrom to another component within the system. The mating end 182 is configured to be inserted into the corresponding module channel 116 (shown in FIG. 1). In an exemplary embodiment, exterior surface of the pluggable body 180, such as sides, the top, the bottom, may be engaged by the gasket assembly 200 (shown in FIGS. 1 and 2). The pluggable body 180 includes latch pockets 186 (should be located on the front side of 198) at the sides that receive the slider arms 192 of the latch 190. The retaining tabs 150 of the receptacle cage 110 (shown in FIGS. 1 and 2) are received in the latch pockets 186 to engage the latch 190. The latch 190 may be movable in the latch pockets 186, such as sliding rearward to release the retaining tabs 150.

The pluggable module 106 includes a module circuit board 188 that is configured to be communicatively coupled to the communication connector 112 (shown in FIG. 1). The module circuit board 188 may be accessible at the mating end 182. The module circuit board 188 may include components, circuits and the like used for operating and/or using the pluggable module 106. For example, the module circuit board 188 may have conductors, traces, pads, electronics, sensors, controllers, switches, inputs, outputs, and the like associated with the module circuit board 188, which may be mounted to the module circuit board 188, to form various circuits.

In an exemplary embodiment, the pluggable body 180 provides heat transfer for the module circuit board 188, such as for the electronic components on the module circuit board 188. For example, the module circuit board 188 is in thermal communication with the pluggable body 180 and the pluggable body 180 transfers heat from the module circuit board 188. In various embodiments, the pluggable body 180 may include a plurality of heat transfer fins (not shown) along at least a portion of the pluggable module 106 to transfer heat away from the main shell of the pluggable body 180, and thus from the module circuit board 188 and associated components. In the illustrated embodiment, the fins are parallel plates that extend lengthwise; however, the fins may have other shapes in alternative embodiments, such as cylindrical or other shaped posts.

The pluggable module 106 includes the latch 190. The latch 190 includes a pull tab 194 extending between the slider arms 192 and a tether 196 extending rearward from the pull tab 194. The pull tab 194 is configured to be pulled rearward to release the latch 190 and allow removal of the pluggable module 106 from the receptacle cage 110. The latch 190 includes latch release tabs 198 at distal ends of the slider arms 192. The latch release tabs 198 are configured to engage the retainer tabs 150 to release the retainer tabs 150 and allow removal of the pluggable module 106 from the receptacle cage 110. In various embodiments, EMI leakage paths may be created between the slider arms 192 and the pluggable body 180 when the slider arms 192 are separated or spaced apart from the pluggable body 180. The slider pressure tabs 160 (shown in FIGS. 1 and 2) are configured to engage the slider arms 192 and press the slider arms 192 inward toward the pluggable body 180 to reduce or eliminate the size of the gap or spacing between the slider arms 192 and the pluggable body 180. As such, the slider pressure tabs 160 reduce EMI leakage along the pluggable module 106.

Figure 4:
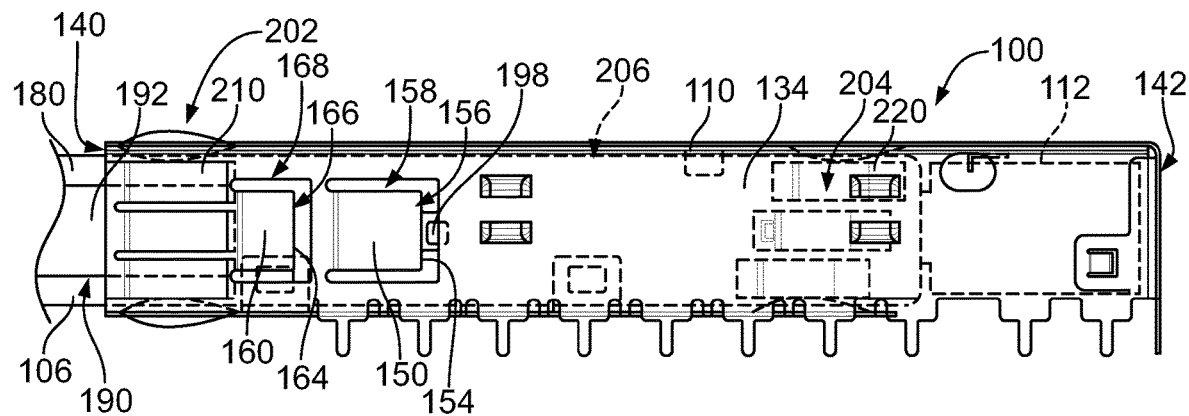
FIG. 4 is a side view of the communication system showing the receptacle cage in accordance with an exemplary embodiment.
Figure 5:
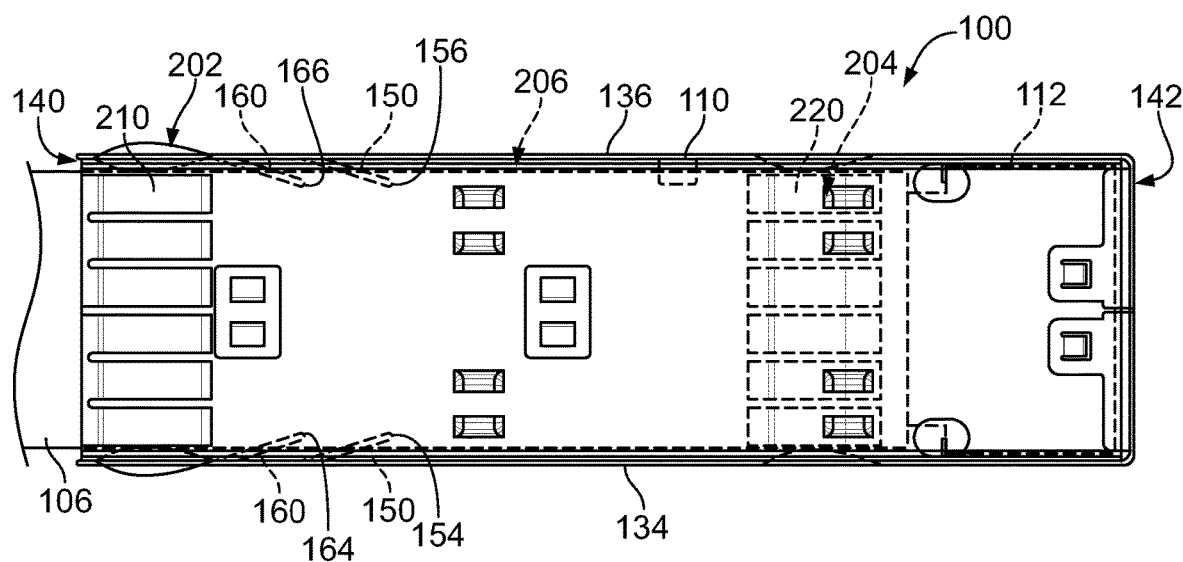
FIG. 5 is a top view of the communication system showing the receptacle cage in accordance with an exemplary embodiment.

FIG. 4 is a side view of the communication system 100 showing the receptacle cage 110 in accordance with an exemplary embodiment. FIG. 5 is a top view of the communication system 100 showing the receptacle cage 110 in accordance with an exemplary embodiment. FIGS. 4 and 5 illustrate the retainer tabs 150 and the slider pressure tabs 160 configured to engage the pluggable module 106. FIGS. 4 and 5 illustrate the pluggable module 106 coupled to the communication connector 112 (shown in phantom).

The retainer tabs 150 are integral with the receptacle cage 110, such as being stamped from the side walls 134, 136 and bent inward. Retainer tab gaps 158 surround the retainer tabs 150. The retainer tab gaps 158 are formed during stamping of the side walls 134, 136 to form the retainer tabs 150. The retainer tabs 150 extend into the module channel 116 to engage the pluggable module 106 and retain the pluggable module 106 in the module channel 116. The edges 156 at the distal ends 154 are configured to engage the pluggable module 106, such as the latch 190 and/or the latch pocket 186 of the pluggable body 180. The latch release tabs 198 are configured to engage and release the retainer tabs 150, such as when the latch 190 is actuated (for example, pulled in a forward direction).

In the illustrated embodiment, the receptacle cage 110 includes a single slider pressure tab 160 on each side wall 134, 136. The slider pressure tabs 160 are located between the retainer tabs 150 and the front end 140 of the receptacle cage 110. The slider pressure tabs 160 may be located proximate to the front gasket 202 to interface with the latch 190 close to the front end 140. The slider pressure tab 160 is integral with the receptacle cage 110, such as being stamped from the side walls 134, 136 and bent inward. Slider pressure tab gaps 168 surround the slider pressure tabs 160. The slider pressure tab gaps 168 are formed during stamping of the side walls 134, 136 to form the slider pressure tabs 160. The edges 166 at the distal ends 164 of the slider pressure tabs 160 are configured to engage the pluggable module 106, such as the slider arms 192 of the latch 190. The slider pressure tabs 160 press the slider arms 192 inward toward the pluggable body 180 with a pressing force. The normal force created by the slider pressure tabs 160 cause the slider arms 192 to engage the pluggable body 180 to reduce or eliminate EMI leakage along the pluggable body 180, such as between the pluggable body 180 and the slider arms 192.

The front gasket 202 is located at the front end 140 of the receptacle cage 110. In an exemplary embodiment, the front gasket 202 includes the gasket fingers 210 along the exterior and the interior of the receptacle cage 110. The internal gasket fingers 210 are configured to engage the pluggable module 106. The gasket fingers 210 may engage the top, the bottom, and both sides of the pluggable module 106.

The rear gasket 204 is located proximate to the communication connector 112 at the rear end 142 of the receptacle cage 110. The gasket fingers 220 of the rear gasket 204 are configured to engage the mating end 182 of the pluggable module 106. The gasket fingers 220 may engage the top, the bottom, and both sides of the pluggable module 106.

The retainer tabs 150 and the slider pressure tabs 160 are located in the shield chamber 206 between the rear gasket fingers 220 and the front gasket fingers 210. The slider pressure tabs 160 extend into the shield chamber 206 to engage the slider arms 192 of the latch 190. The slider pressure tabs 160 reduce EMI leakage along the pluggable module 106 within the shield chamber 206 between the pluggable body 180 and the slider arms 192.

Figure 6:
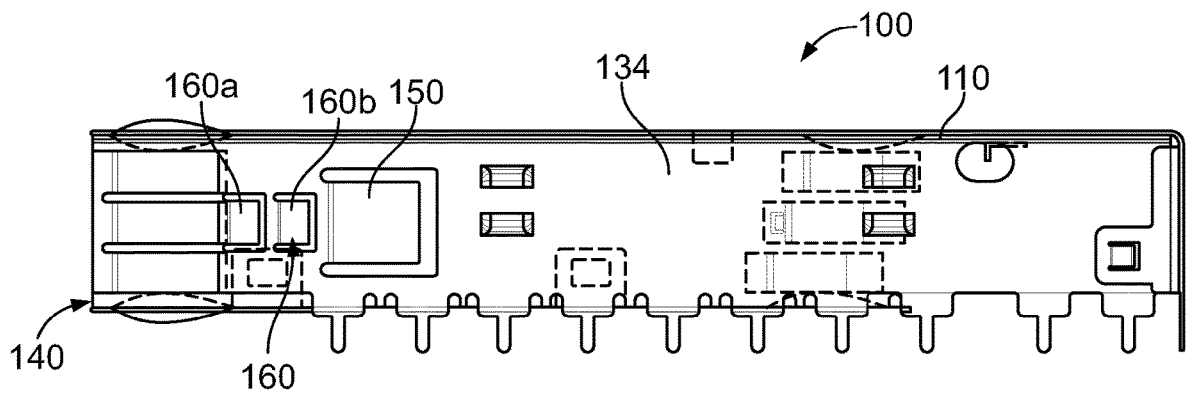
FIG. 6 is a side view of the communication system showing the receptacle cage in accordance with an exemplary embodiment.

FIG. 6 is a side view of the communication system 100 showing the receptacle cage 110 in accordance with an exemplary embodiment. In the illustrated embodiment, the receptacle cage 110 includes a pair of slider pressure tabs 160 on each side wall 134, 136, including a forward slider pressure tab 160a and a rearward slider pressure tab 160b. The slider pressure tabs 160 are located between the retainer tabs 150 and the front end 140 of the receptacle cage 110. The slider pressure tabs 160a, 160b interface with the latch 190 (shown in FIG. 3) at multiple points of contact along each slider arm 192 (shown in FIG. 3). The slider pressure tabs 160 are integral with the receptacle cage 110, such as being stamped from the side walls 134, 136 and bent inward. The slider pressure tabs 160 engage the slider arms 192 at different locations along the slider arms 192 to press the slider arm 192 inward to engage the pluggable body 180 and reduce or eliminate EMI leakage along the pluggable body 180, such as between the pluggable body 180 and the slider arms 192.

Figure 7:
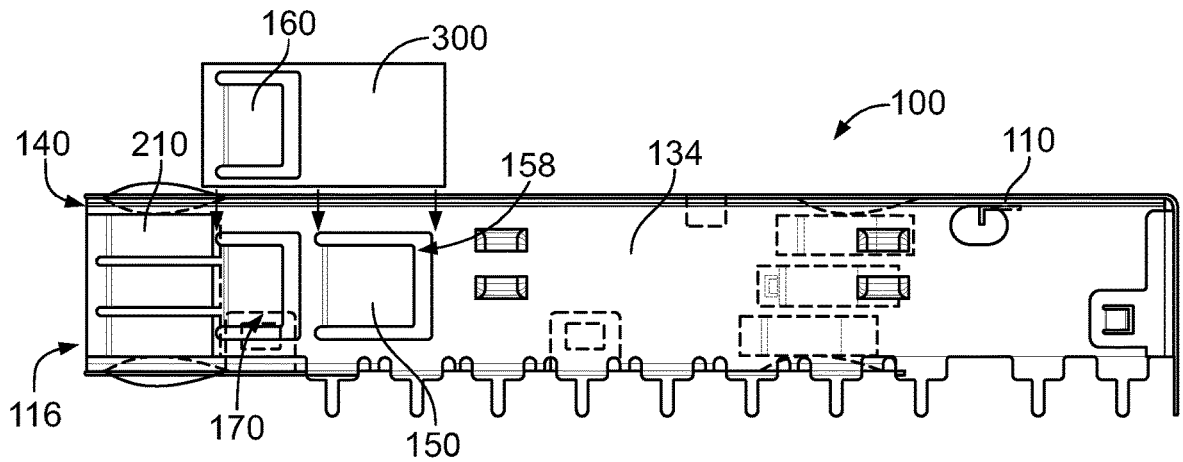
FIG. 7 is an exploded, side view of the communication system showing the receptacle cage in accordance with an exemplary embodiment.
Figure 8:
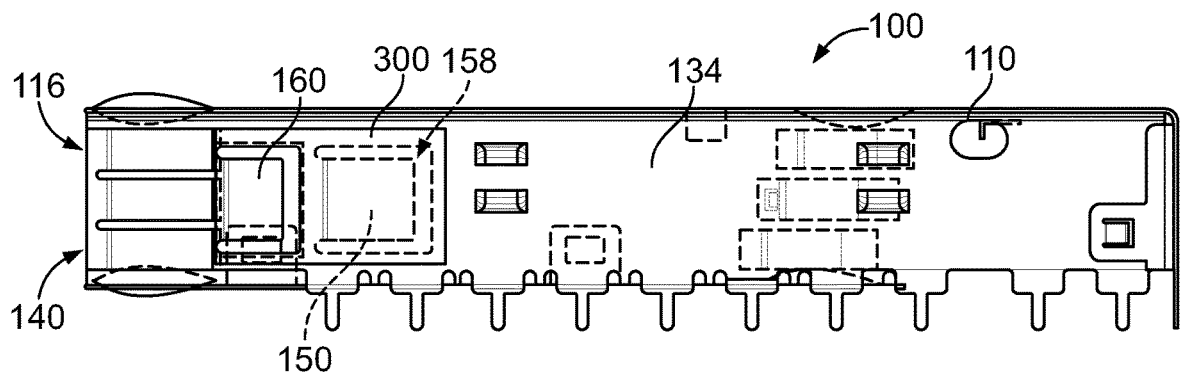
FIG. 8 is an assembled, side view of the communication system showing the receptacle cage in accordance with an exemplary embodiment.

FIG. 7 is an exploded, side view of the communication system 100 showing the receptacle cage 110 in accordance with an exemplary embodiment. FIG. 8 is an assembled, side view of the communication system 100 showing the receptacle cage 110 in accordance with an exemplary embodiment. In an exemplary embodiment, the side walls 134, 136 include openings 170 between the retainer tabs 150 and the front gasket fingers 210. The openings 170 provide access to the module channel 116.

In an exemplary embodiment, the receptacle cage 110 includes covers 300 configured to be coupled to the side walls 134, 136. The cover 300 is used to at least partially cover the corresponding opening 170. The cover 300 may be used to cover the retainer tab gap 158 surrounding the retainer tab 150 to prevent EMI leakage through the retainer tab gap 158. In an exemplary embodiment, the cover 300 includes the slider pressure tab 160. For example, the slider pressure tab 160 is formed integral with the cover 300 being stamped from the cover 300 and bent inward. The slider pressure tab 160 is received in the opening 170 and the module channel 116. The slider pressure tab 160 passes through the opening 170 into the module channel 116 to engage the pluggable module 106. The cover 300 may be manufactured from a thicker sheet of metal than the receptacle cage making the slider pressure tab 160 stiffer to create greater normal force when pressing against the slider arm 192. In an alternative embodiment, the slider pressure tab 160 may be part of the side wall 134, 136 rather than the cover 300. In various embodiments, the cover 300 is used to cover both the slider pressure tab gap 168 (shown in FIG. 3) that surrounds the slider pressure tab 160 and the retainer gap 158 to reduce EMI leakage through the slider pressure tab gap 168 and the retainer gap 158.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle cage assembly comprising:
cage walls forming a module channel configured to receive a pluggable module, the cage walls extending between a front end and a rear end of the receptacle cage, at least one of the cage walls being a latch wall including a first retainer tab configured to engage a latch of the pluggable module to retain the pluggable module in the module channel; and
a first slider pressure tab extending from the latch wall into the module channel, the first slider pressure tab configured to engage a slider arm of the latch to press the slider arm inward toward a pluggable module body of the pluggable module, wherein the first slider pressure tab is integral with the latch wall being stamped from the latch wall and bent inward into the module channel.

2. The receptacle cage assembly of claim 1, wherein the first slider pressure tab exerts a normal force on the slider arm to force the slider arm toward the pluggable module body.

3. The receptacle cage assembly of claim 1, wherein the first slider pressure tab is located between the first retainer tab and the front end of the cage walls.

4. The receptacle cage assembly of claim 1, further comprising a second slider pressure tab extending from the latch wall into the module channel, the second slider pressure tab configured to engage the slider arm of the latch to press the slider arm inward toward the pluggable module body.

5. The receptacle cage assembly of claim 1, further comprising a second slider pressure tab extending from a second latch wall into the module channel, the second slider pressure tab configured to engage a second slider arm of the latch to press the second slider arm inward toward the pluggable module body.

6. The receptacle cage assembly of claim 1, wherein the first retainer tab includes a proximal end and a distal end rearward of the proximal end, the first retainer tab deflectable relative to the latch wall at the proximal end, the first slider pressure tab including a proximal end and a distal end, the first slider pressure tab deflectable relative to the latch wall at the proximal end.

7. The receptacle cage assembly of claim 1, further comprising a cover coupled to the latch wall, the cover covering the first retainer tab and the first slider pressure tab.

8. The receptacle cage assembly of claim 1, further comprising a cover coupled to the latch wall, the first slider pressure tab being integral with the cover being stamped from the cover and bent inward, the latch wall including an opening receiving the first slider pressure tab such that the first slider pressure tab extends from the cover through the opening into the module channel.

9. The receptacle cage assembly of claim 1, further comprising a front gasket at the front end of the cage walls, the front gasket extending into the module channel to engage the pluggable module, the first slider pressure tab being located proximate to the front gasket.

10. The receptacle cage assembly of claim 9, further comprising a rear gasket coupled to the cage walls, the rear gasket located immediately forward of a communication module, the rear gasket extending into the module channel to engage a mating end of the pluggable module.

11. The receptacle cage assembly of claim 10, wherein a shield chamber is defined between the front gasket and the rear gasket, the first retainer tab extending into the shield chamber, the first slider pressure tab extending into the shield chamber.

12. A receptacle cage assembly comprising:
cage walls including a top wall, a first side wall, and a second side wall, the top wall, the first side wall, and the second side wall forming a module channel configured to receive a pluggable module, the cage walls extending between a front end and a rear end of the receptacle cage;
tabs stamped from at least one of the cage walls and bent into the module channel, the tabs configured to engage a latch of the pluggable module, the tabs having tab gaps in the at least one cage wall around the tab formed by the stamping; and
at least one cover coupled to the cage walls to cover the tab gaps and the tabs to prevent EMI leakage through the tab gaps.

13. The receptacle cage assembly of claim 12, wherein the tabs include a first retainer tab extending from the first side wall into the module channel, the first retainer tab configured to engage the latch of the pluggable module to retain the pluggable module in the module channel, wherein the cover covers the tab gap surrounding the first retainer tab.

14. The receptacle cage assembly of claim 12, wherein the tabs include a first slider pressure tab extending from the first side wall into the module channel, the first slider pressure tab configured to engage a slider arm of the latch to press the slider arm inward toward a pluggable module body of the pluggable module, the first slider pressure tab exerts a normal force on the slider arm to force the slider arm toward the pluggable module body.

15. The receptacle cage assembly of claim 14, wherein the tabs include a second slider pressure tab extending from the first side wall into the module channel, the second slider pressure tab configured to engage the slider arm of the latch to press the slider arm inward toward the pluggable module body.

16. The receptacle cage assembly of claim 12, wherein the tabs include a first slider pressure tab extending from the first side wall into the module channel and a second slider pressure tab extending from the second side wall into the module channel, the first and second slider pressure tab configured to engage slider arms of the latch to press the slider arms inward toward a pluggable module body of the pluggable module.

17. The receptacle cage assembly of claim 12, further comprising a front gasket and a rear gasket, the front gasket located at the front end of the cage walls, the front gasket extending into the module channel to engage the pluggable module, the first slider pressure tab being located proximate to the front gasket, the rear gasket located immediately forward of a communication module, the rear gasket extending into the module channel to engage a mating end of the pluggable module.

18. A receptacle cage assembly comprising:
cage walls including a top wall, a first side wall, and a second side wall, the top wall, the first side wall, and the second side wall forming a cavity including a module channel configured to receive a pluggable module, the cage walls extending between a front end and a rear end of the receptacle cage, at least one of the cage walls including a latching feature stamped from at least one of the cage walls and bent into the module channel to engage a latch of the pluggable module to retain the pluggable module in the module channel;

a cover coupled to the corresponding cage wall having the latching feature, the cover covering the latching feature;

a communication module received in the cavity, the communication module configured to mate with a mating end of the pluggable module;

a front gasket at the front end of the receptacle cage, the front gasket extending into the module channel, the front gasket being configured to engage the pluggable module; and a rear gasket coupled to the receptacle cage, the rear gasket located immediately forward of the communication module, the rear gasket extending into the module channel, the rear gasket being configured to engage the pluggable module;

wherein a shield chamber is defined between the front gasket and the rear gasket.

19. The receptacle cage assembly of claim 18, wherein at least one of the cage walls is a latch wall having the latching feature, the latch wall includes a slider pressure tab extending into the module channel, the slider pressure tab configured to engage a slider arm of the latch to press the slider arm inward toward a pluggable module body of the pluggable module, the slider pressure tab extending into the shield chamber defined between the front gasket and the rear gasket.

20. The receptacle cage assembly of claim 19, wherein the first slider pressure tab is integral with the latch wall being stamped from the latch wall and bent inward into the module channel.

* * * * *